(12) United States Patent
Thirouin et al.

(10) Patent No.: US 9,719,843 B2
(45) Date of Patent: Aug. 1, 2017

(54) OPTIMIZED HOUSEHOLD SCALE WITH REMOVABLE STORAGE CONTAINER

(71) Applicant: SEB S.A., Ecully (FR)

(72) Inventors: Stéphane Thirouin, Lyons (FR); Michel Sarrazin, Massingy (FR)

(73) Assignee: SEB S.A., Ecully (FR)

( * ) Notice: Subject to any disclaimer, the term of this patent is extended or adjusted under 35 U.S.C. 154(b) by 48 days.

(21) Appl. No.: 14/709,577

(22) Filed: May 12, 2015

(65) Prior Publication Data

US 2016/0334266 A1   Nov. 17, 2016

(51) Int. Cl.
*G01G 21/22* (2006.01)
*G01G 21/28* (2006.01)

(52) U.S. Cl.
CPC ............. *G01G 21/22* (2013.01); *G01G 21/28* (2013.01)

(58) Field of Classification Search
CPC ......... G01G 21/22; G01G 21/23; G01G 21/28
See application file for complete search history.

(56) References Cited

U.S. PATENT DOCUMENTS

| 4,120,371 | A | * | 10/1978 | Zohn | G01G 21/22 177/262 |
|---|---|---|---|---|---|
| 5,410,108 | A | | 4/1995 | Williams et al. | |
| 8,796,565 | B2 | * | 8/2014 | Lauer | G01G 21/28 177/243 |
| D758,227 | S | * | 6/2016 | Thirouin | D10/91 |
| 2004/0035614 | A1 | | 2/2004 | Zhang | |
| 2009/0205877 | A1 | * | 8/2009 | Claypool | G01G 21/22 177/239 |

FOREIGN PATENT DOCUMENTS

| CN | 699565 A1 | 3/2010 | |
|---|---|---|---|
| DE | 42 27 497 A1 | * 4/1993 | ............. G01G 21/28 |

* cited by examiner

*Primary Examiner* — Randy Gibson
(74) *Attorney, Agent, or Firm* — Oblon, McClelland, Maier & Neustadt, L.L.P.

(57) ABSTRACT

A household scale including a housing intended to be placed horizontally during use, the housing including a support, at least one weight measuring system, connected to a display unit for the result of the measurement, the scale being designed to hold on the support, during use, and a container for holding an item or ingredient. The housing includes a connection to the support enabling the support to hold the container in the following two positions. A stowage position in which the container is attached to the support regardless of the position of the scale in space, and a position of use in which the container is set down on the support not attached to it.

19 Claims, 5 Drawing Sheets

OPTIMIZED HOUSEHOLD SCALE WITH REMOVABLE STORAGE CONTAINER

The present invention involves the area of weighing devices, more particularly, a household scale.

BACKGROUND OF THE INVENTION

Devices of the aforementioned type generally have a plate able to hold a weight, a measurement device present on the plate comprising a means of display to display the measured weight, and means of control or adjustment.

When using such an apparatus, it becomes necessary to use a container designed to hold the ingredient(s) or article(s) being weighed so that they do not make direct contact with the plate for reasons of hygiene, practicality, and cleanliness. This is particularly necessary when the ingredient being weighed is in bulk form and not easy to maintain on the plate. For example, it might be solid ingredients such as flour, powdered sugar or pieces of sugar, or liquid ingredients . . . . In this case, said container is weighed at the same time as the foodstuff and the displaying of the result takes into account a subtraction of the weight of the container. The container is often removable from the weighing apparatus to facilitate the cleaning of the container and the transporting of the food being weighed.

There are many products on the market involving a food scale with a removable container. However, without any means of attachment, the apparatus has to remain in the position of use, that is, horizontal, to maintain the container in place by gravity even when not being used. It is not possible to stow the scale away with the container attached in a position other than the position of use, for example, to hang it against a wall. Thus, this type of apparatus has the drawback of a lack of ease of stowage.

BRIEF SUMMARY OF THE INVENTION

The purpose of the present invention is to propose a weighing apparatus which is easy to stow and move around, and this with its removable container.

Another purpose of the invention is a weighing apparatus with a reduced footprint when stowed away or moved around.

Another purpose of the invention is a container holding items being weighed which is adapted for wall hanging, while remaining attached to a weighing apparatus.

These purposes are achieved with a household scale comprising:
- a housing intended to be placed horizontally during use, said housing comprising a support for the item or ingredient being weighed,
- at least one weight measuring system, connected to a display unit for the result of the measurement,
- the scale being designed to hold on said support, during use, a container for holding an item or ingredient.

According to the invention, said housing comprises means of connection to said support enabling said support to hold said container in the following two positions:
- A stowage position in which the container is attached to the support regardless of the position of the scale in space,
- A position of use in which the container is set down on the support not attached to it.

By "container" is meant a receptacle such as a dish having an essentially flat bottom and sloping edges, able to hold a bulk item being weighed. When the container is maintained attached to the support in stowage/movement mode, the container follows the movement and the position of the support without falling off. When the container is set down on the support in weighing mode, the container is subject only to gravity and can be easily moved from the support, since it is not attached to the support, and it can be slid on the support. Thus, the scale can be stowed away in other than the horizontal position without the container being separate from it: the container remains integrated in contact with the support regardless of its position. For example, the scale can be hooked or suspended on the wall with the container, without the container falling off of it.

Advantageously, said connection means exert a magnetic force and the container has supplemental means of connection subject to said magnetic force, so that said magnetic force is able to hold onto the container only when the latter is in the stowage position. The supplemental means of connection are provided to be subjected—or not—to the magnetic force of the connection means by virtue of a reference distance between the two means, allowing the connection means to act in the stowage position upon the supplemental means of connection—and respectively permitting the connection means to not act on the supplemental means of connection in the stowage position. A designed separation distance depending on the two positions and on the magnetic force is specified.

Thus, no magnetic force is exerted when the container is in the functioning position on top of the support, its edge raised upward. The use of magnetic means for holding the container on the scale enables a smaller footprint for the product. This also has the advantage of a more aesthetic appearance. This also avoids any means of attachment sticking out from the support or the container and which might get dirty or broken in event of rough handling of the scale.

According to a first embodiment, the connection means comprise at least one permanent magnet. The supplemental means of connection comprise at least one part made of ferromagnetic material.

More precisely, according to one variant, said support has a first planar surface and a first chamfer peripheral to the first planar surface and said at least one magnet is arranged adjacent to the chamfer, and the container has a second planar surface and a second chamfer peripheral to the second planar surface and said at least one part is arranged at its periphery.

Said chamfers have the shape of a slope. The fact of placing the active and passive means in the area of the chamfers and at the periphery makes it possible to optimize the distribution of force and the number of materials used. Also, the force acts only in the area of the chamfer, at the periphery of the support.

According to one characteristic of this embodiment, said at least one magnet has a parallelepiped shape, at least one face of which is essentially parallel to said first chamfer.

The magnet being located below the planar surface of the support, a distance is created so that no magnetic force is exerted at the level of the planar surface of the support, or such that the magnetic force is low enough not to disturb the mobility of the container. This configuration makes it possible to hold the container by magnetic force only in the stowage position.

Advantageously, the connection means comprise at least two permanent magnets; the supplemental means of connection comprise at least two metallic parts; the magnets and metallic parts being arranged so that the magnet and the metallic part of each pair are opposite each other in the stowage position.

The magnet and the metallic part can thus be facing each other so that the magnetic force exerted is a maximum. This makes it possible to optimize the magnetic force in the stowage position.

In order to further equilibrate the magnetic attraction, the magnets and metallic parts are distributed regularly over the periphery of the support and the container.

Furthermore, the first chamfer and the second chamfer are oriented to be essentially parallel in the stowage position. Thus, in the stowage position the container essentially covers the entire support, that is, the second planar surface covers the first planar surface plane and the second chamfer covers the first chamfer.

According to one characteristic of this embodiment, the first chamfer and the second chamfer are oriented at an angle (a) between 20° and 70° with respect to the planar surfaces in the position of use, more particularly, between 40° and 50°, for example 45°. Such a geometry of the chamfers allows for a more firm holding.

According to another characteristic of this embodiment, the support has a disk shape with a chamfered periphery and the container has a disk shape with a chamfered periphery. Thus, the support and the container respectively present an essentially circular planar surface and an essentially circular peripheral chamfer.

Advantageously, the number of magnets is greater than three, for example, equal to five, in order to accentuate the magnetic force for a more firm and stable attachment. The magnets can then be identical.

According to one characteristic of this embodiment, at least the second peripheral chamfer is entirely metallic, more particularly, the entire container is metallic.

According to a second embodiment, said support has a first planar surface and said connection means are arranged adjacent to said planar surface, and said container has a planar bottom and an inclined wall, said at least one part composed of ferromagnetic material being arranged in the area of said planar bottom.

Advantageously, said container comprises between said inclined wall and the planar bottom means of spacing from the support, allowing one to move the planar bottom from the first planar surface by a distance (d) between 2 mm and 5 mm in the position of use.

Moreover, said means of spacing comprise folds which protrude relative to the planar bottom, designed to make contact with the support in the position of use.

According to one characteristic of this embodiment, the first planar surface has a circular shape and the container has a disk shape with an inclined wall periphery, the largest diameter of the inclined wall being greater than that of the first planar surface.

Advantageously, at least the planar bottom is entirely metallic, more particularly, the entire container is metallic.

According to the two embodiments of the invention, the scale comprises a means of hanging on the housing, such as a hook allowing a wall suspension.

These purposes are likewise achieved with an assembly comprising a household scale and at least one container, namely, the container can have the following characteristics:

the container has supplemental means of connection subject to said magnetic force, so that said magnetic force is able to hold onto the container only when the latter is in the stowage position, the container has a second planar surface and a second chamfer peripheral to the second planar surface and said at least one part is arranged at its periphery, the supplemental means of connection comprise at least one part made of ferromagnetic material, the supplemental means of connection comprise at least two metallic parts, the magnets and metallic parts being arranged so that the magnet and the metallic part of each pair are opposite each other in the stowage position, the first chamfer and the second chamfer are oriented to be essentially parallel in the stowage position, the first chamfer and the second chamfer are oriented at an angle between 20° and 70° with respect to the planar surfaces in the position of use, more particularly, between 40° and 50°, for example 45°, the container has the shape of a disk with a chamfered periphery, at least the second peripheral chamfer is entirely metallic, more particularly, the entire container is metallic, or said support has a first planar surface and said connection means are arranged adjacent to said planar surface, and said container has a planar bottom and an inclined wall, said at least one part composed of ferromagnetic material being arranged in the area of said planar bottom.

Said container comprises between said inclined wall and the planar bottom means of spacing from the support, allowing one to move the planar bottom from the first planar surface by a distance (d) between 2 mm and 5 mm in the position of use.

Said means of spacing comprise folds which protrude relative to the planar bottom, designed to make contact with the support in the position of use.

The first planar surface has a circular shape and the container has a disk shape with an inclined wall periphery, the largest diameter of the inclined wall being greater than that of the first planar surface.

At least the planar bottom is entirely metallic, more particularly, the entire container is metallic.

BRIEF DESCRIPTION OF THE DRAWINGS

The invention will be better understood upon perusing embodiments which are in no way limiting and which are illustrated by the enclosed drawings, where.

DETAILED DESCRIPTION OF THE INVENTION

Figure 1:
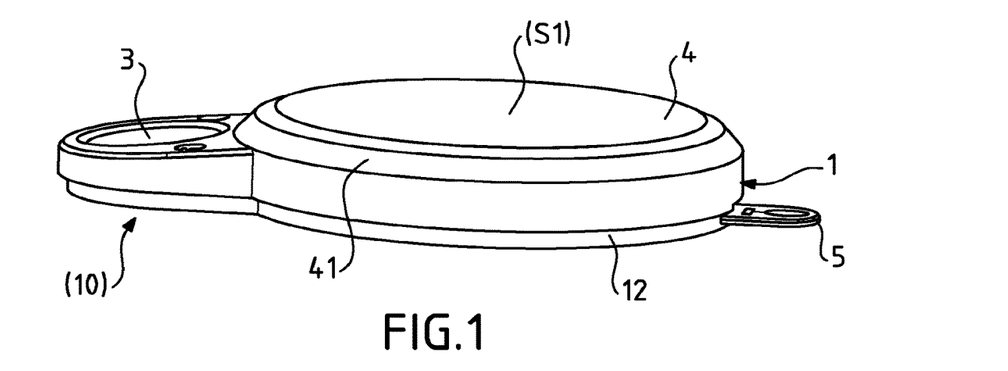
FIG. 1 is a perspective view of the scale without the container according to a first embodiment.

A household scale as illustrated in FIG. 1 and designated overall by reference 10 comprises a housing 1 defining a body 12 of generally circular shape, designed to rest on a flat work surface in horizontal manner when in use, and a support 4 in the shape of a round plate supported by the body 12. The scale 10 also comprises a weighing device comprising at least one weight sensor connected to a weight measuring system connected to a display unit 3 for the result of the measurement. The display unit 3 may comprise a liquid crystal display. Around the display unit 3 are arranged control buttons 6, 7 of various functions. The scale 10 has at the end of the housing 1 a means of hanging 5 in the shape of a half-circle or half-ring enabling a wall suspension.

Said body 12 supports the weighing device which comprises an electronic circuit 8 powered by batteries and sensors assembled in the body 12. The sensors comprise strain gauges connected to the electronic circuit 8 by wiring. When weighing an item, the strain gauges are deformed under the action of the weight and modify the electrical signal measured by the electronic circuit 8, which then calculates the weight present on the support 4 and displays it on the display unit.

Figure 2:
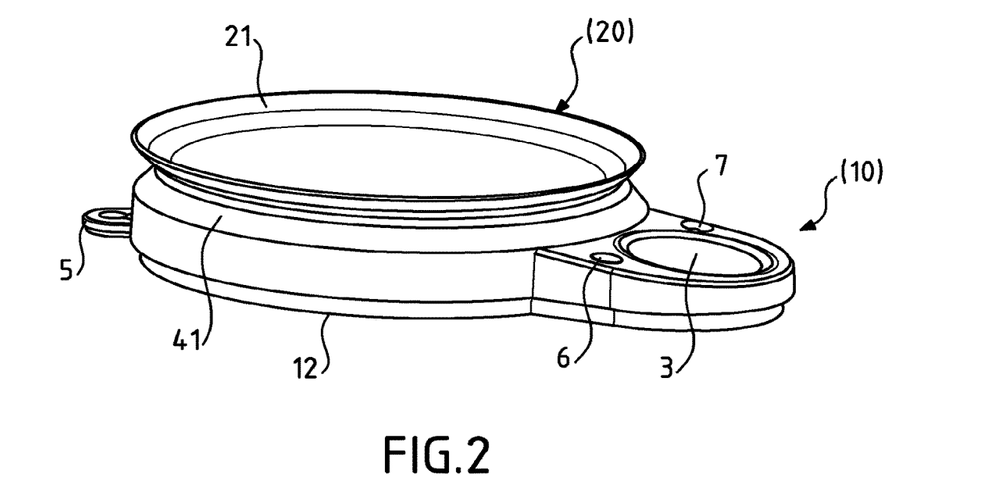
FIG. 2 is a perspective view of the scale with the container placed on the support, in position of use according to the first embodiment.

As is illustrated in FIG. 2, and according to a first embodiment, a container 20 is available to the user to put therein the item or ingredient being weighed. Said container 20 has the typical shape of a dish with a circular flat bottom and a rim and it can be easily moved during use to transport the item being weighed or for cleaning.

As for the geometry of the scale and the container, as described above, the support has a first planar surface (S1) and a first peripheral chamfer 41, while the container has a second planar surface (S2) and a second peripheral chamfer 21. The two planar surfaces (S1, S2) have essentially the same diameter so that the one is directly beneath the other when the container 20 is placed on the support 4.

FIG. 2 illustrates the position of use in which the container 20 is placed freely on top of the support 4. The container 20 can also take up a different, or so-called stowage position, in which the container 20 is attached to the support by the magnetic force. In this position, the container is able to follow the position of the scale, even if it is in a position other than horizontal, for example, when the scale is hung on the wall.

Figure 3:
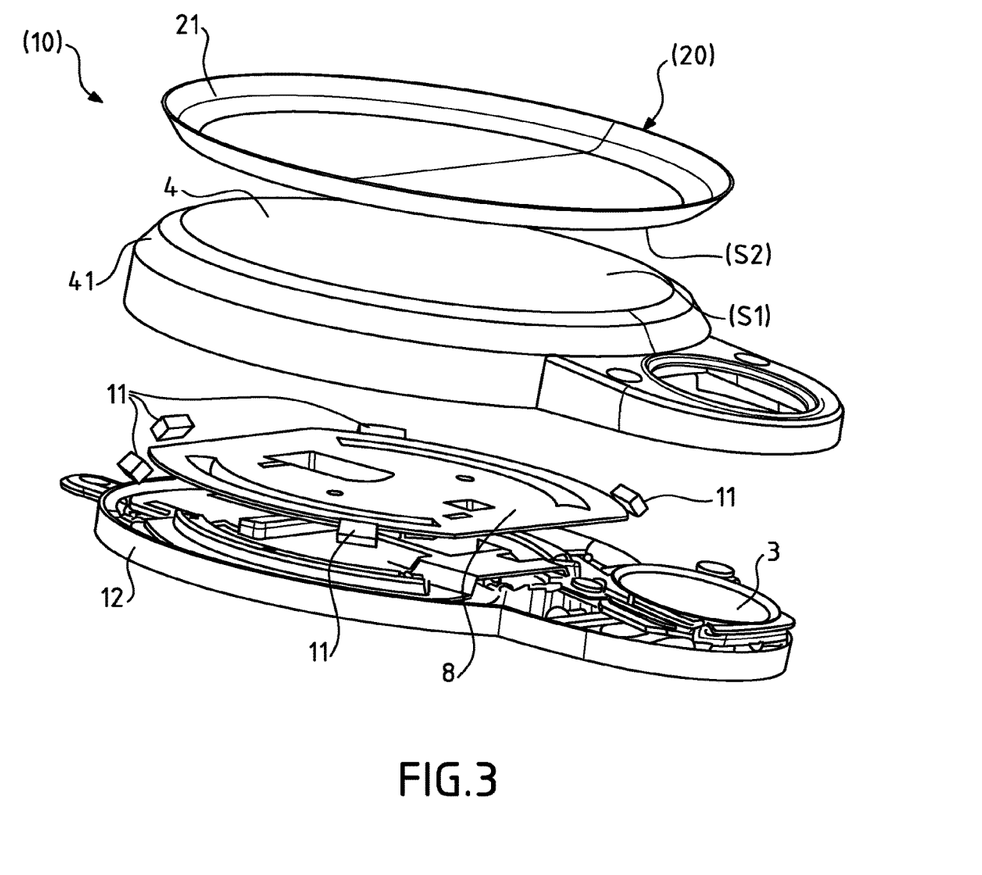
FIG. 3 is an exploded view of the scale in position of use according to the first embodiment.

To do so, and as can be seen in FIG. 3, the support 4 comprises connection means 11 containing a series of five permanent magnets 11 exerting a magnetic force, the magnets 11 being distributed in regular manner on the periphery of the support 4 at the level of the first chamfer 41. In order for the container 20 to stay attached in the stowage position, it comprises supplemental means of connection 21 on the second peripheral chamfer 21, subjected to the magnetic force. Said supplemental means of connection 21 comprise at least one part 21 made of ferromagnetic material. In order to simplify the design, the container is entirely ferromagnetic metallic or at least the second peripheral chamfer 21 is entirely ferromagnetic metallic.

Figure 4:
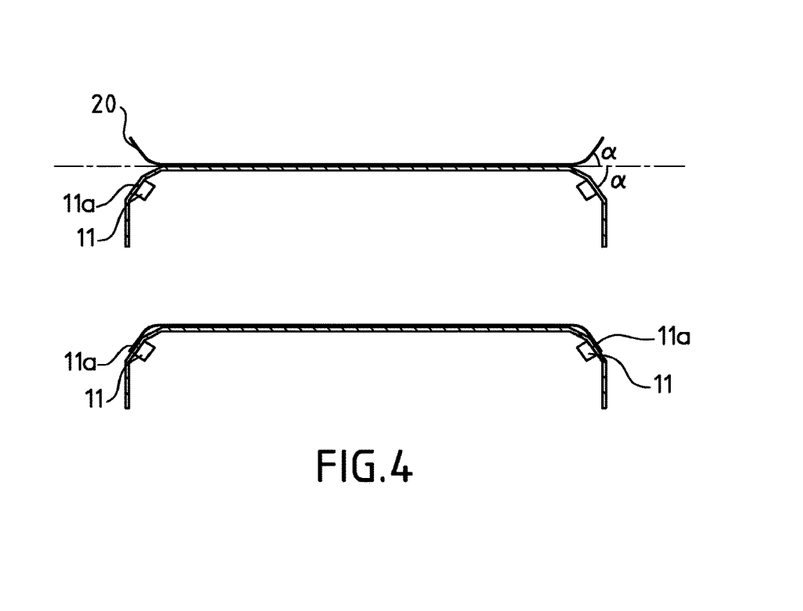
FIG. 4 is a diagram of the two positions which the container can assume in the first embodiment.

Moreover, the first and the second chamfer are oriented by an angle α with respect to the planar surfaces which is essentially equal to 45°, as in the example illustrated in FIG. 4. Thus, the two chamfers are essentially parallel in the stowage position.

Figure 5:
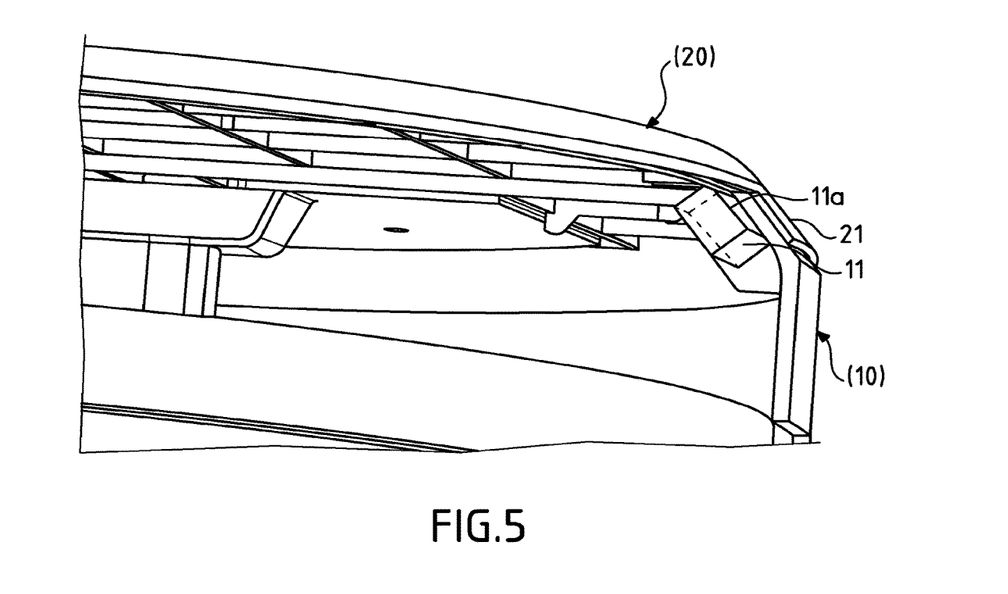
FIG. 5 is a detailed view of the scale with the container placed on the support, in position of stowage, according to the first embodiment.

As can be seen in FIGS. 4 and 5, each magnet has a parallelepiped shape whose at least one face 11a is essentially parallel with the first chamfer 41. The magnets are thus arranged inside the support at the level of the chamfer and do not make contact with, or at least do not exert magnetic force on the first planar surface (S1). That is, the magnets 11 can work only in the stowage position when the container 20 is placed upside down, as in FIG. 5.

Figure 6:
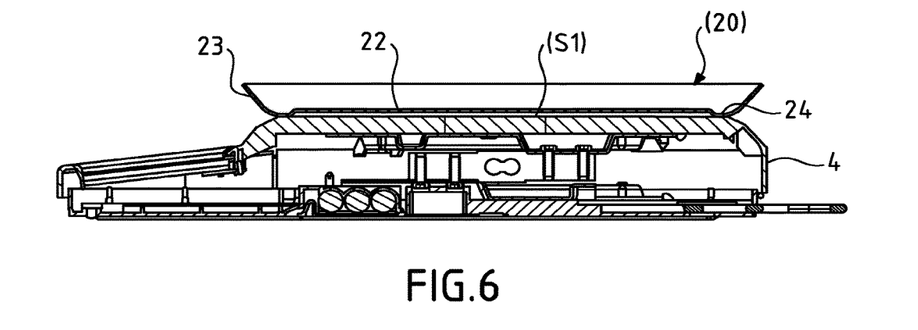
FIG. 6 is a sectional view of the scale with the container in position of use according to a second embodiment.
Figure 7:
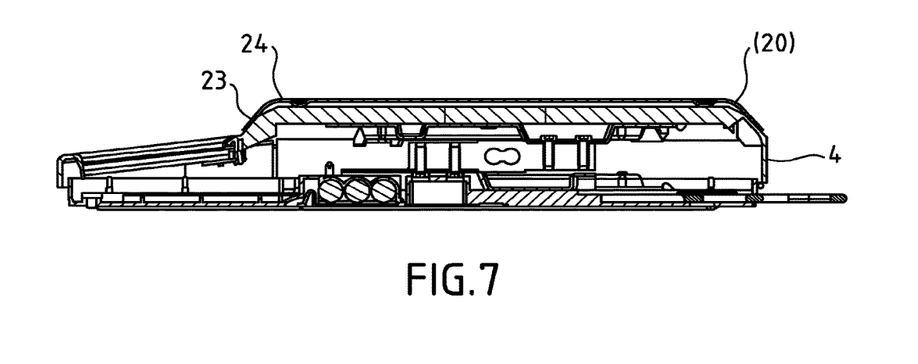
FIG. 7 is a sectional view of the scale with the container in position of stowage according to the second embodiment.
Figure 8:
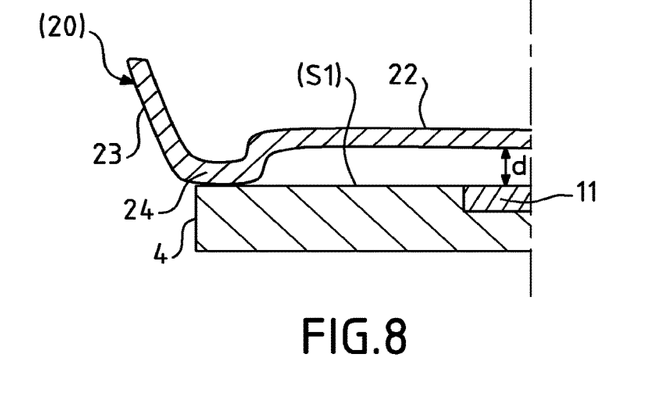
FIG. 8 is a schematic view in half profile section of the scale with the container in position of use according to the second embodiment.

According to the second embodiment, and as shown in FIGS. 6 to 8, the support 4 has a first planar surface (S1) intended to receive the container 20. Said container 20 according to the second embodiment has a planar bottom 22 and an inclined wall 23. Moreover, the container 20 has means of spacing 24 from the support 4 which are folds 24 protruding with respect to the flat bottom 22 on the side opposite the inclined wall 23. Thus, when the container 20 is placed on the first planar surface (S1) of the support 4 in the position of use, the protruding folds 24 make contact with the support 4, which allows the flat bottom 22 to be removed from the first planar surface (S1) by a distance d as can be seen in FIG. 8. This gap distance makes it possible to escape the magnetic attraction, and it is between 2 mm and 5 mm. The position of use according to the second embodiment is illustrated in FIG. 6.

When the container 20 is in the stowage position, it can be put back onto the support 4 as shown in FIG. 7. This time, it is the flat bottom 22 of the container which makes contact with the first planar surface (S1). For this, the inclined wall 23 has a larger perimeter than that of the first planar surface (S1). For example, in the case where the flat bottom 22 and the first planar surface (S1) are square or rectangular in shape, the widths of the inclined wall 23 are greater than the corresponding widths of the first planar surface (S1).

According to the example shown, the first planar surface (S1) has a circular shape and the container 20 takes on the shape of a disk with the circular flat bottom 22 and circular inclined wall 23. In this configuration, the largest diameter of the inclined wall 23 is greater than that of the first planar surface (S1).

In order to keep the container 20 in the stowage position regardless of the position of the scale, at least one magnet 11 is arranged adjacent to said first planar surface (S1) and the supplemental means of connection 22 comprise at least one part 22 made of ferromagnetic metal situated on the flat bottom 22. In order to facilitate manufacturing, the container is entirely made of ferromagnetic metal, or at least the flat bottom 22 is entirely ferromagnetic metal. In the illustration, the magnet 11 is arranged at the center of the support 4, but it can be arranged on the entire surface of the support 4 and far enough away from the means of spacing.

Figure 9:
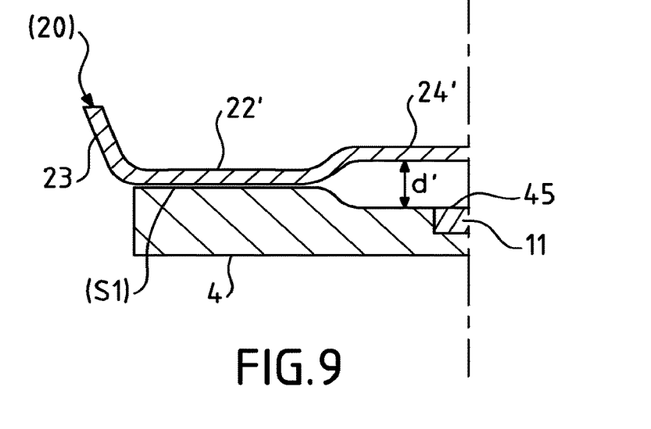
FIGS. 9 and 10 illustrate a third embodiment of the invention.
Figure 10:
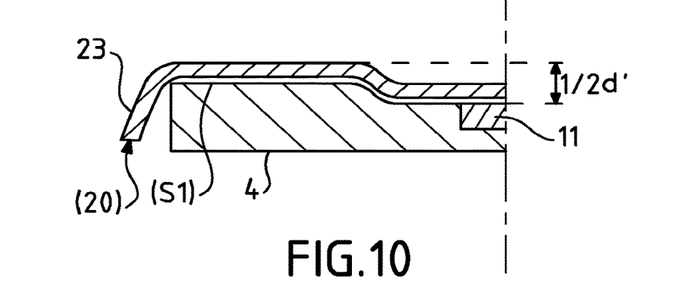

According to a third embodiment, as shown in FIGS. 9 and 10, the container 20 has a flat bottom 22' and an inclined wall 23. Moreover, the container 20 has supplemental means of connection 24' of the support 4 in the form of a central zone of protuberance 24' by a distance ½ d' as compared to the flat bottom 22' and on the same side as the inclined wall 23. While the support 4 has a first planar surface (S1) and a hollow central zone 45 having a shape complementary to that of the central zone of protuberance 24' of the container 20. The depth of this hollow central zone 45 is ½ d'. Thus, when the container 20 is placed on the first planar surface (S1) of the support 4 in the position of use, the flat bottom 22' makes contact with the planar surface (S1) and the central zone of protuberance 24' is separated from the hollow central zone 45 by a distance d' as shown in FIG. 9. This gap distance d' makes it possible to escape the magnetic attraction, and it is between 2 mm and 5 mm.

When the container 20 is in the stowage position, it can be turned over and placed on the support 4 as shown in FIG. 10. This time, the assemblage of the flat bottom 22' and the central zone of protuberance 24' of the container make contact respectively with the first planar surface (S1) and the hollow central zone 45 of the support 4. For this, the inclined wall 23 has a larger perimeter than that of the first planar surface (S1). For example, in the case when the flat bottom 22 and the first planar surface (S1) are square or rectangular in shape, the widths of the inclined wall 23 are greater than the corresponding widths of the first planar surface (S1).

According to the example shown, the first planar surface (S1) has a circular shape and the container 20 assumes the shape of a disk with the circular flat bottom 22' and the circular inclined wall 23. In this configuration, the largest diameter of the inclined wall 23 is greater than that of the first planar surface (S1).

In order to keep the container 20 in the stowage position regardless of the position of the scale, at least one magnet 11 is arranged adjacent to said first planar surface (S1) in the hollow central zone 45 and the supplemental means of connection 24' comprise at least one part 24' made of ferromagnetic metal situated at the central zone of protuberance 24'. In order to facilitate manufacturing, the container is entirely ferromagnetic metal, or at least the central zone of protuberance 24' is entirely ferromagnetic metal. In the illustration, the magnet 11 is arranged at the center of the support 4, but it can be arranged on the entire hollow central zone 45.

According to the invention, the magnets have characteristics suitable to the size of the scale while ensuring the attachment of the container. For example, each magnet has a dimension of 6×8×17 mm, and a level of remanent magnetic induction of 0.4 to 1.4 Tesla. The magnets are attached to the support by gluing, but they could be attached by any other mode of fixation available to the skilled person, such as by snap riveting.

For an easy and intuitive use by the user, one might contemplate a weighing assembly comprising a scale and a container as described above. The scale and the container each have geometrical and technical characteristics allowing the container to take up the two positions, that is, the position of use and the position of stowage. The container can likewise be offered individually as a replacement part in event of loss or damage.

Of course, various other modifications can be made to the invention within the scope of the following claims.

The invention claimed is:

1. A household scale comprising:
a housing configured to be placed horizontally during use, said housing comprising a support,
at least one weight measuring system, connected to a display unit for the result of the measurement,
the scale being configured to hold on said support, during use, a container for holding an item or ingredient,
wherein said housing comprises a connection device to said support enabling said support to hold said container in the following two positions:
a stowage position in which the container is attached to the support regardless of the position of the scale in space,
a position of use in which the container is set down on the support and not attached to the support by the connection device.

2. The household scale according to claim 1, wherein said connection device exerts a magnetic force and the container has a supplemental connection device subject to said magnetic force, so that said magnetic force is able to hold onto the container only when the latter is in the stowage position.

3. The household scale according to claim 2, wherein:
the connection device comprises at least one permanent magnet,
the supplemental connection device comprises at least one part made of ferromagnetic material.

4. The household scale according to claim 1, wherein:
the connection device comprises at least one permanent magnet,
said support has a first planar surface and a first chamfer peripheral to the first planar surface and said at least one magnet is arranged adjacent to the chamfer, and wherein:
the container has a second planar surface and a second chamfer peripheral to the second planar surface and where said at least one part is arranged at its periphery.

5. The household scale according to claim 4, wherein said at least one magnet has a parallelepiped shape, at least one face of which is essentially parallel to said first chamfer.

6. The household scale according to claim 5, wherein:
the connection device comprises at least two permanent magnets;
the supplemental connection device comprises at least two metallic parts,
the magnets and metallic parts being arranged so that the magnet and the metallic part of each pair are opposite each other in the stowage position.

7. The household scale according to claim 6, wherein the magnets and metallic parts are distributed regularly over the periphery of the support and the container.

8. The household scale according to claim 4, wherein the first chamfer and the second chamfer are oriented to be essentially parallel in the stowage position.

9. The household scale according to claim 4, wherein the first chamfer and the second chamfer are oriented at an angle (α) between 20° and 70° with respect to the planar surfaces in the position of use.

10. The household scale according to claim 9, wherein the support has a disk shape with a chamfered periphery and the container has a disk shape with a chamfered periphery.

11. The household scale according to claim 6, wherein the number of magnets is greater than three.

12. A household scale according to claim 4, wherein at least the second peripheral chamfer is entirely metallic.

13. A household scale according to claim 1, wherein:
said support has a first planar surface and said connection device is arranged adjacent to said planar surface, and wherein:
said container has a planar bottom and an inclined wall, said at least one part composed of ferromagnetic material being arranged in the area of said planar bottom.

14. A household scale according to claim 13, wherein said container comprises between said inclined wall and the planar bottom means of spacing from the support, allowing one to move the planar bottom from the first planar surface by a distance between 2 mm and 5 mm in the position of use.

15. A household scale according to claim 14, wherein said means of spacing comprise folds which protrude relative to the planar bottom, designed to make contact with the support in the position of use.

16. A household scale according to claim 15, wherein the first planar surface has a circular shape and the container has a disk shape with an inclined wall periphery, the largest diameter of the inclined wall being greater than that of the first planar surface.

17. A household scale according to claim 1, wherein said container has a planar bottom and at least the planar bottom is entirely metallic.

18. A household scale according to claim 1, wherein it comprises a means of hanging on the housing.

19. An assembly comprising a household scale and at least one container according to claim 1.

* * * * *